Patented Dec. 9, 1952

2,621,199

UNITED STATES PATENT OFFICE 2,621,199

PRODUCTION OF LEAD ALKYLS

Oscar G. Gilbert, Detroit, Mich., assignor to Ethyl Corporation, New York, N. Y., a corporation of Delaware No Drawing. Application April 30, 1951, Serial No. 223,825

8 Claims. (Cl. 260—437)

My present invention relates to the production of lead alkyls. More particularly, it is concerned with an improvement of the known reaction between a sodium-lead alloy and an alkyl halide.

The best known lead alkyls are the tetraalkyllead compounds containing from four to eight carbon atoms and the most important member of this group commercially is tetraethyllead. This compound is presently produced by the reaction of ethyl chloride upon a sodium-lead alloy containing approximately atomic equivalents of the two metals, which may be represented by the formula NaPb. During this reaction the sodium in the alloy combines with the chlorine of the ethyl chloride, while four ethyl groups become attached to an atom of lead leaving three atomic equivalents of lead unreacted, as may be seen from the following equation:

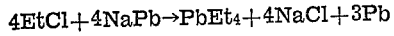
$$4EtCl + 4NaPb \rightarrow PbEt_4 + 4NaCl + 3Pb$$

The reaction is generally carried out in an autoclave at temperatures of about 70° to 80° C., employing an excess of ethyl chloride.

It is also known to produce tetraethyllead by the direct reaction between ethyl chloride and lead in the presence of an iodide catalyst according to the following equation:

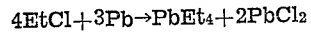
$$4EtCl + 3Pb \rightarrow PbEt_4 + 2PbCl_2$$

This reaction requires temperatures of at least 100° C. preferably about 120° to 130° C. It is slow and incomplete and moreover, is to some degree hazardous, since the tetraethyllead formed tends to decompose rapidly and exothermically at such elevated temperatures. Numerous suggestions have been made to carry out this reaction in conjunction with the previously described reaction, in order to utilize the unreacted lead. However, such suggestions have not been realized in practice for the reasons indicated.

It is customary in the industry to refer to the first reaction in which the sodium is consumed as the "A" reaction and to the second reaction wherein lead is reacted directly as the "B" reaction. My invention is concerned with the improvement of the "A" reaction.

In the present commercial operation of the "A" reaction, the sodium-lead alloy is introduced into an autoclave which is then sealed. Thereupon the autoclave is heated and liquid ethyl chloride is forced in slowly, while the reaction mass is continuously agitated, the temperature being maintained within the desired range of 50° C. to 80° C. This portion of the operation is called the "feed" period. The feed period is generally about 45 minutes, during which time a considerable amount of reaction takes place. After all the ethyl chloride has been added, the reaction is continued at a temperature of about 60° C. with constant stirring for a period of about 1½ to 2 hours. This is known as the "cook" period. At the end of the cook period the autoclave is vented to atmospheric pressure, while maintaining the temperature, whereby most of the excess ethyl chloride is removed. The autoclave may then be opened and the reaction mass worked up to recover the tetraethyllead produced. A large amount of lead is also recovered which may be reconverted into a sodium-lead alloy and thus reused.

As the ethyl chloride is fed into the autoclave, the sodium-lead alloy disintegrates into smaller, sandy particles, and it takes on the appearance of a material not unlike that of moist sand. Subsequently these particles tend to agglomerate forming swollen, popcorn-like aggregates (as viewed under the microscope). As this change takes place, the apparent volume of the mass increases until it reaches about three to four times the initial apparent volume. Unless a very large excess of ethyl chloride is employed, no liquid becomes apparent in the reaction mass. Before the end of the feed period, the reaction mass has swollen to its ultimate volume, and throughout the cook period it retains a voluminous, seemingly dry form, and the application of considerable power is required in order to operate the agitator. At the conclusion of the cook period, when the autoclave is vented and the reaction mass is allowed to cool, the apparent volume of the porous mass is somewhat reduced, but it remains at least twice that of the original charge of alloy. Moreover, the mass becomes quite firm, thus introducing difficulties in the working up thereof.

I have found that the reaction just described can be greatly improved from the operational standpoint by the addition of small amounts of certain substances, particularly iodine and compounds containing iodine, to the reactants before substantial reaction has taken place. These additives have the remarkable effect of maintaining the solids in the reaction mass in the form of dense, granular sharp-edged particles entirely free from voids. Thus these additives effectively prevent the above described increase in the apparent volume of the reaction mass and keep it in a very fluid condition, permitting agitation by the application of relatively little power. Instead of the reaction mass becoming dry and voluminous, it forms a fluid suspension of small dense sharp-edged particles that will readily settle, leaving a supernatant liquid, when stirring is discontinued. There is no appreciable increase in the apparent volume of the reaction mass, such as takes place without the use of my additives.

The great advantages in the economy of the operation resulting from the use of my additives will be apparent. The most important advantage is that the useful capacity of the autoclave is considerably increased, since allowance need no longer be made for the increase in apparent volume of the reaction mass. Another important advantage is that the consumption of power required for agitating the reaction mass is greatly reduced due to its fluid condition. Yet another advantage is the comparative ease, and shorter time required, for removal of the tetraethyllead and spent reaction mass from the autoclave. In addition, the tetraethyllead can be recovered from the reaction mass with greater ease due to the physical condition of the mass. Furthermore, the agitation of the reaction mass is not only easier to accomplish, but is also much more efficient. This results in faster and improved heat removal from the reaction mass thereby improving the control of the reaction. Overall my improved process will permit appreciable economies in the total time required for conducting the tetraethyllead reaction. Further the use of iodine by my invention reduces the required amount of ethyl chloride used. Additional advantages will become apparent as the detailed description of my invention proceeds.

The preferred additives employed in accordance with my invention are iodine and compounds containing iodine. These appear to be the most effective in accomplishing the objects of my invention, but I have also found that bromine and compounds containing bromine will produce the desired effects to a somewhat lesser degree. There is some difference in the effectiveness of the iodine and bromine depending upon whether they are applied in the free state and upon the particular compounds in which they may be combined. Generally speaking, a proportion of from about 0.1 per cent to about 5 per cent by weight of iodine (free or combined), with reference to the sodium-lead alloy, is sufficient for my purposes. In the case of bromine and its compounds, the required proportions are higher, being from about 3 per cent to about 10 per cent. There is some variation within the aforesaid ranges depending upon the form in which the iodine and bromine are applied. The optimum proportion in each case may readily be determined. Below this optimum the desired effects are produced to a lesser degree, if at all, while the addition of larger proportions produces substantially no increase in the desired effects and in fact may bring about other effects that are disadvantageous. In general, contrary to practice in the "B" reaction, as little iodine as possible should be used since excessive iodine tends to poison the "A" reaction.

The iodine and bromine compounds suitable for use according to my invention may be either inorganic or organic. The preferred types are the heavy metal salts and the lower alkyl compounds. However, such compounds as benzyl iodide and carbon tetraiodide have been found to be quite effective. Among the heavy metal salts which are especially suitable are the lead and cadmium iodides. However, the bromides and iodides of zinc, mercury, aluminum, and other metals are also effective. The preferred lower alkyl compounds are ethyl iodide and bromide but other alkyl halides such as methyl, propyl, butyl and amyl, can also be used.

The mechanism whereby my additives produce their profound effects upon the nature of the reaction mass is not known to me. However, it appears that they may take some part in the reaction, since, for example, the iodine is usually recovered to the extent of about 80 per cent in the form of inorganic iodides, regardless of the form in which it was introduced. When adding lead iodide, some of it will be recovered in the form of ethyl iodide. Evidently, it is the iodine or the bromine that is responsible for the improvement in the characteristics of the reaction mass, although their effectiveness varies depending upon the atoms and groups with which they are combined. Probably the solubility of the compounds in ethyl chloride and the ease with which the iodine or bromine can be split off are factors in determining the relative effectiveness of the compounds. Generally speaking, those compounds which are readily soluble or can be readily suspended in the ethyl chloride and wherein the halogen is present in a labile form are the most effective. Undoubtedly the physical properties, particularly the ease with which the additive can uniformly be distributed in the reaction mixture, are of importance.

In order to produce the desirable results previously described in the carrying out of the "A" reaction, it is preferable that my additives be present throughout practically the entire period, i. e., during both the feed and cook periods. For example, when lead iodide was added at the end of the feed period, no improvements as outlined herein were obtained. Certainly my additives must be present throughout a major portion of the reaction. If the reaction is permitted to take place to any substantial extent in the absence of my additives, then the undesirable swelling and stiffening of the reaction mass takes place to a marked degree. The subsequent introduction of my additives will not eliminate the damage thus done, although they may prevent its becoming more extensive. Consequently, I prefer to introduce my additives near the beginning of the reaction, thus insuring their presence whenever any of the sodium-lead alloy is affected by the ethyl chloride. This may be accomplished by uniformly distributing the additive throughout the sodium-lead alloy before introduction of the ethyl chloride. For certain of my additives they are more conveniently introduced with the ethyl chloride either uniformly throughout the feed, or all at once with the initial portions. In any event the entire quantity of the additive must be added by the end of the "feed" period. Further, the additive preferably should be dissolved or mixed in the ethyl chloride to assure its simultaneous distribution throughout the reaction mass.

The use of iodine and compounds containing iodine as catalysts for the "B" reaction has been described in the U. S. Patent No. 2,414,058. Although the patentee was not concerned with any improvement of the "A" reaction, he made the customary suggestion that the "A" and "B" reactions might be conducted consecutively in the same reaction vessel. In doing this he preferred to first carry out the normal "A" reaction, then remove the tetraethyllead thereby formed by vacuum distillation, then add additional alkyl halide together with the catalyst for the "B" reaction. He pointed out that it was essential to raise the reaction temperature substantially above 100° C. in order to bring about a substantial "B" reaction. He also proposed to conduct both "A" and "B" reactions simultaneously at such elevated temperatures. This would indeed change the character of the "A" reaction since the "A" reaction rate would actually be reduced in comparison with the rate at 80° C., and the tetraethyllead formed would undergo more or less thermal decomposition. At a reaction temperature of 100° C., the "A" reaction yield would be reduced to a level of no commercial significance. Because it is highly exothermic, such decomposition can lead to serious operational difficulties unless it is rigidly controlled.

My invention may be illustrated by the following example, but it is, of course, not limited to the details given therein.

*Example*

450 grams of lead iodide were thoroughly mixed with 15 kilograms of a finely divided sodium-lead alloy having the composition indicated by the formula NaPb. Thus 3.0 per cent by weight of iodine base on the weight of the alloy were incorporated in the latter. This mixture was charged into an autoclave having a capacity of about 5 gallons. The autoclave was provided with a mechanical stirrer and with a water jacket, whereby the temperature therein was controlled. After introduction of the so modified sodium-lead alloy, the autoclave was heated to about 50° C. and sealed. Stirring was then commenced and continued throughout the reaction.

15.8 pounds of liquid ethyl chloride, i. e., 1.7 times the theoretical amount required for reaction with the sodium, were then fed into the autoclave at a constant rate during a period of 45 minutes through a valved inlet. The temperature was maintained between 70° C. and 80° C. during the feed time. Thereupon the reaction was continued for a further 100 minutes at about 80° C.

At the end of said period the stirrer was stopped, and excess ethyl chloride was vented to the atmosphere. The stirrer was then again set in motion and venting continued at 80° C. for an additional 15 minutes, whereby practically all of the excess ethyl chloride was removed. The autoclave was then cooled to about 30° C. while stirring was continued. The reaction mass was then discharged from the autoclave into the usual still where the tetraethyllead produced was recovered by steam distillation. A normal yield of about 85 per cent of theory was thus readily obtained.

The outstanding feature of the process in the above described example was the absence of the usual swelling and stiffening of the reaction mass. Instead of a puffed-up mass having an apparent volume three to four times that of the original charge being formed, the alloy was converted into dense granules that offered little resistance to the stirrer. There was practically no increase in the apparent volume of the charge. Upon conclusion of the reaction in the autoclave and discontinuance of the stirring, the reaction mass separated into a liquid phase and a solid phase consisting of the aforesaid dense granules. Subsequent steam distillation to recover the tetraethyllead from this mixture was relatively simple, when compared with working up a reaction mass produced under the same conditions without addition of the lead iodide.

Instead of the lead iodide employed in the foregoing example, other heavy metal iodides such as cadmium, the iodides of cobalt, silver, magnesium, ferrous, arsenic, antimony, stannic, cuprous, and others have been successfully employed. Carbon tetra-iodide or ethyl iodide likewise give excellent results especially when they were introduced with the ethyl chloride, rather than incorporated in the sodium-lead alloy. Excellent results have also been obtained with free iodine, and methylene iodide, while ethyl bromide and bromine proved only slightly less effective.

I have described my improved method with particular reference to the production of tetraethyllead. However, it is also applicable to the production of other lead alkyls, such as tetramethyllead, tetrapropyllead and mixed alkyl compounds of lead by the reaction of corresponding alkyl chlorides on a sodium-lead alloy. In all such cases my additives will bring about a marked improvement in the nature of the reaction mass that is formed as the sodium combines with the chlorine and leaves an excess of free lead. My process can, of course, be combined with the catalytic "B" reaction disclosed in the United States Patent No. 2,414,058 However, my principal concern is to improve the "A" reaction, and in the normal operation of my process little or no "B" reaction takes place. This is because my process is conducted at temperatures below 100° C. preferably between about 50° C. and 80° C. If a catalyzed "B" reaction is to follow, then the "B" temperature must be raised to 100° C. or higher because little or no yield is obtained below such temperatures.

As many apparently widely different embodiments of this invention may be made without departing from the spirit and scope hereof, it is to be understood that this invention is not limited to the specific embodiments hereof, except as defined in the appended claims.

I claim:
1. In the process of alkylating the lead in a sodium-lead alloy by reacting with an alkyl chloride at temperatures below 100° C., the step of conducting the reaction in the presence of a small amount of an additive selected from the group consisting of free and combined iodine and bromine to cause the simultaneously produced lead to form as non-coalescing, easily stirred, dense particles that keep the reaction mass from becoming too voluminous.

2. A process as claimed in claim 1, wherein the additive contains from about 0.1 to about 10 per cent by weight of the halogen calculated on the weight of the lead employed.

3. A process as claimed in claim 1, wherein the additive is a compound containing iodine.

4. In the process of producing tetraethyllead by reacting a sodium-lead alloy with ethyl chloride at temperatures below 100° C., the step of conducting essentially the entire reaction in the presence of an additive containing from about 0.1 to about 5 per cent by weight of iodine, calculated on the weight of the sodium-lead alloy.

5. A process as claimed in claim 4 wherein the additive is a heavy metal iodide.

6. A process as claimed in claim 4 wherein the additive is a lower alkyl iodide.

7. A process as claimed in claim 4 wherein the temperatures are maintained at between about 70° and about 80° C. and the additive is ethyl iodide.

8. A process for ethylating the lead of a sodium-lead alloy, which process comprises charging a reaction container more than one-third full of a reaction mixture of sodium-lead alloy, ethyl chloride and a catalytic amount of an additive selected from the class consisting of free and combined iodine and bromine to restrict the reaction mass volume to less than the container volume during the ethylation, and ethylating at a temperature below 100° C.

OSCAR G. GILBERT.

REFERENCES CITED

The following references are of record in the file of this patent:

UNITED STATES PATENTS

| Number | Name | Date |
|---|---|---|
| 1,611,695 | Sullivan et al. | Dec. 21, 1926 |
| 2,414,058 | Pearsall | Jan. 7, 1947 |
| 2,415,444 | Ruddies | Feb. 11, 1947 |
| 2,535,236 | Shapiro | Dec. 26, 1950 |